May 12, 1942. V. J. GRAF 2,282,571
METHOD OF MAKING SINKS
Filed Sept. 20, 1937 7 Sheets-Sheet 1
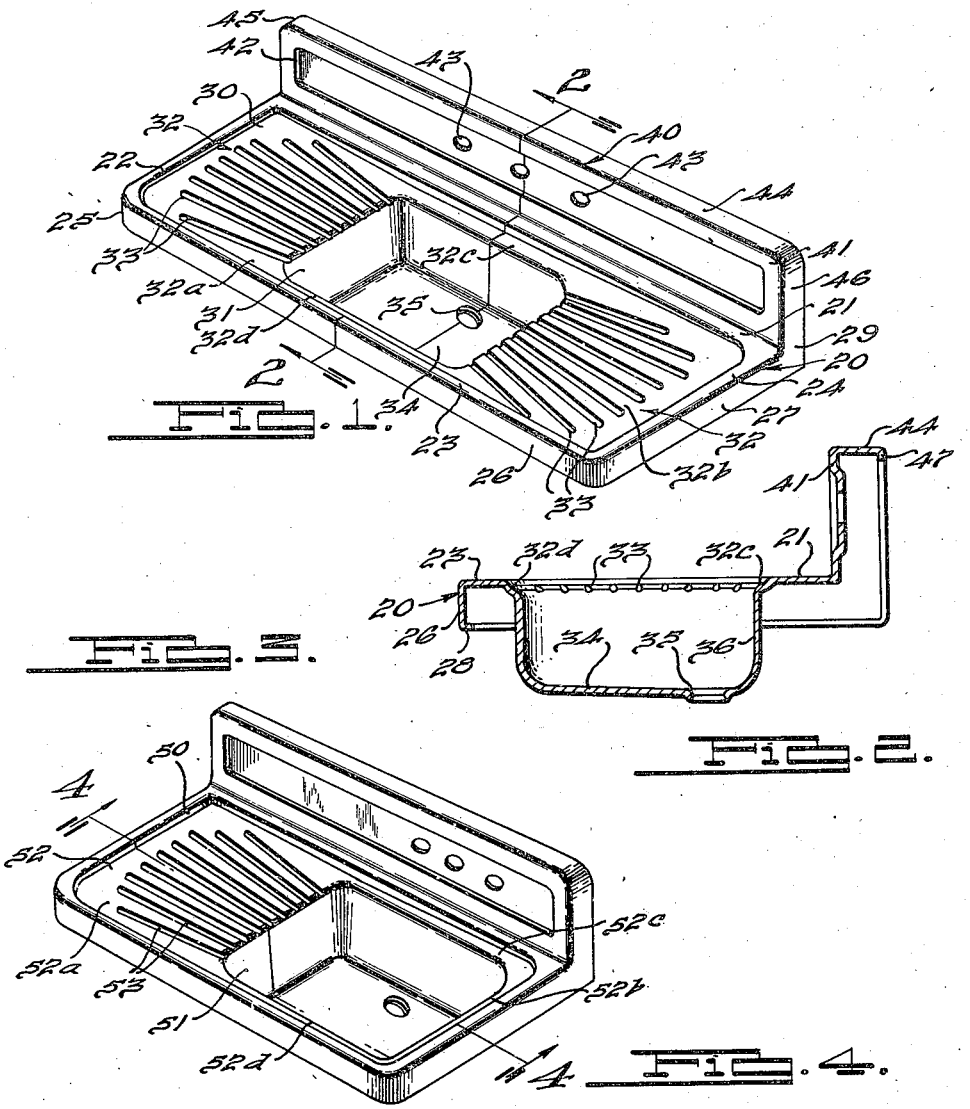
INVENTOR
Vincent J. Graf.
BY Dike, Calver & Gray
ATTORNEYS.

May 12, 1942.  V. J. GRAF  2,282,571

METHOD OF MAKING SINKS

Filed Sept. 20, 1937  7 Sheets-Sheet 2

INVENTOR
Vincent J. Graf.
BY
ATTORNEYS.

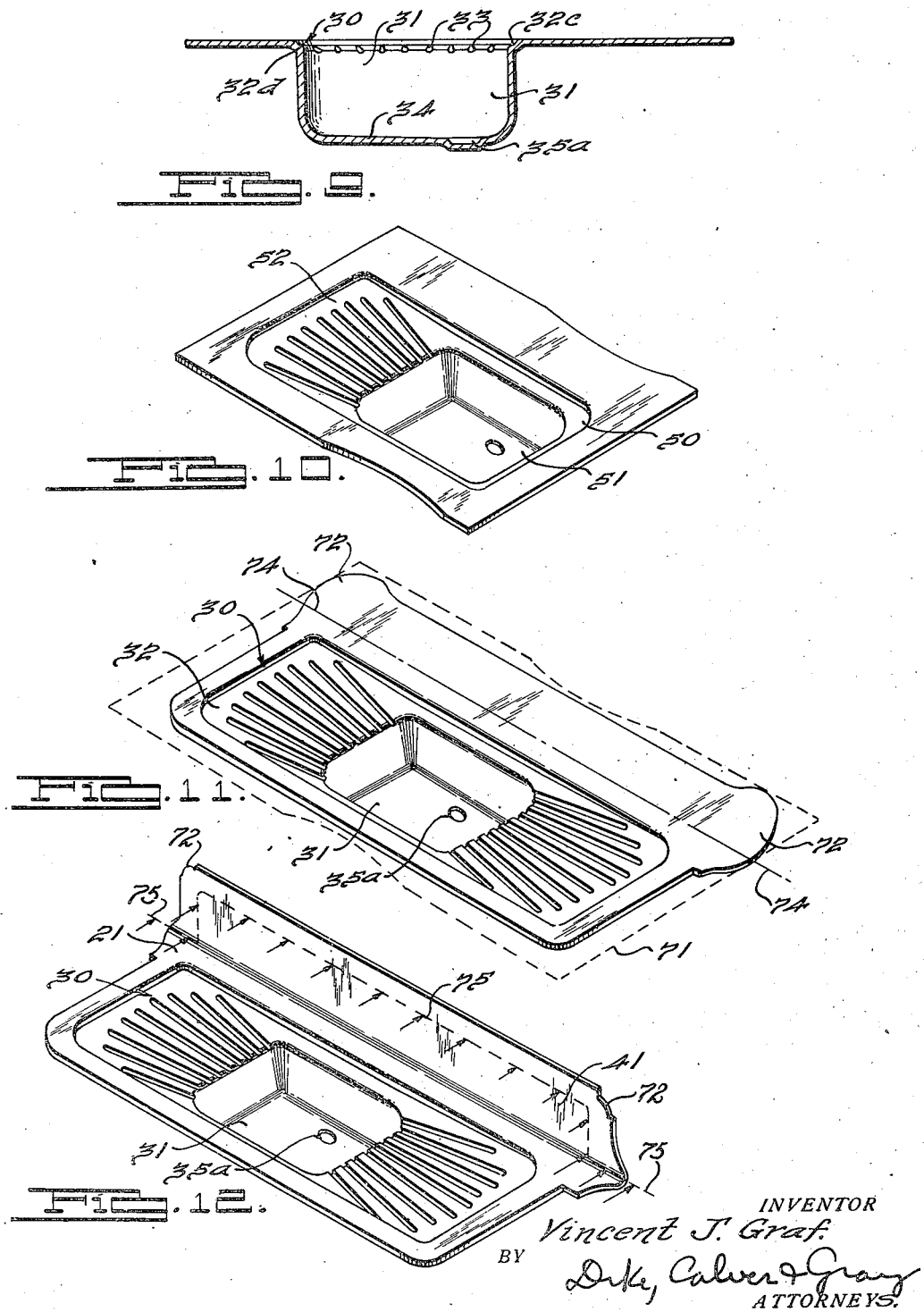

May 12, 1942.  V. J. GRAF  2,282,571
METHOD OF MAKING SINKS
Filed Sept. 20, 1937  7 Sheets-Sheet 4
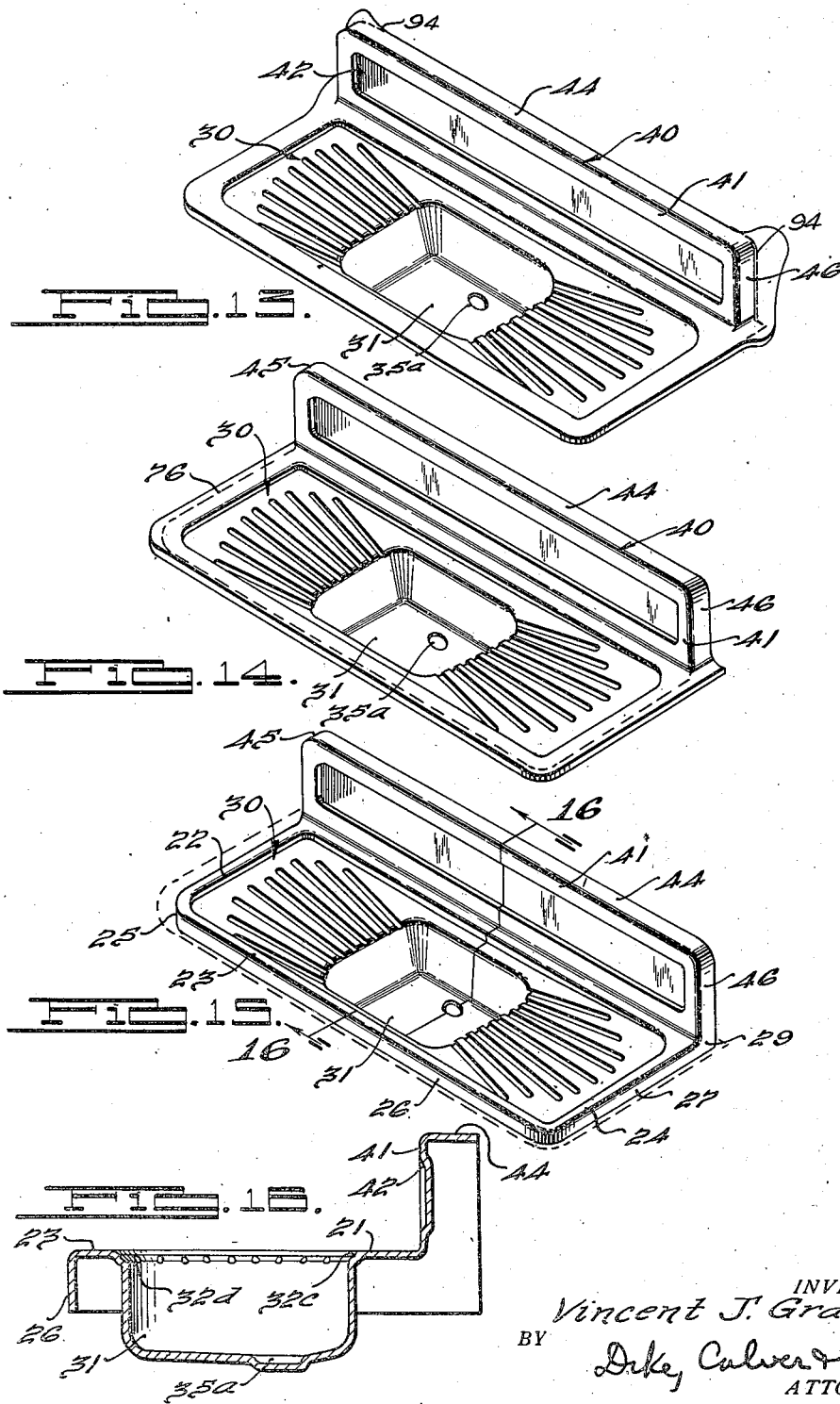
INVENTOR
Vincent J. Graf.
BY
Dikey Culver & Gray
ATTORNEYS.

May 12, 1942. V. J. GRAF 2,282,571
METHOD OF MAKING SINKS
Filed Sept. 20, 1937 7 Sheets-Sheet 5
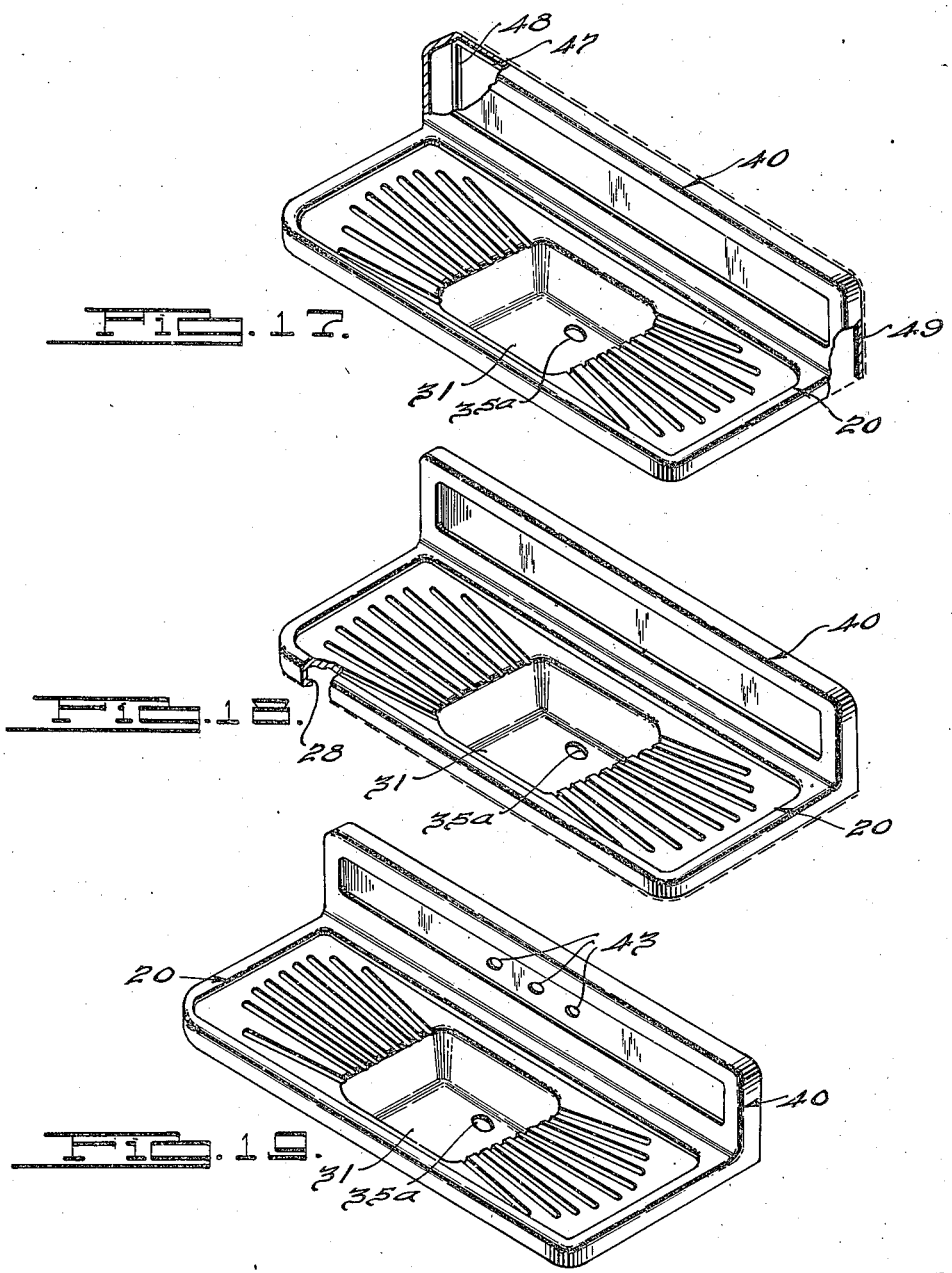
INVENTOR
Vincent J. Graf.
BY Dike, Calver & Gray
ATTORNEYS.

May 12, 1942.   V. J. GRAF   2,282,571
METHOD OF MAKING SINKS
Filed Sept. 20, 1937   7 Sheets-Sheet 6

INVENTOR.
Vincent J. Graf.
BY Dike, Calver & Gray
ATTORNEYS.

May 12, 1942.  V. J. GRAF  2,282,571
METHOD OF MAKING SINKS
Filed Sept. 20, 1937  7 Sheets-Sheet 7
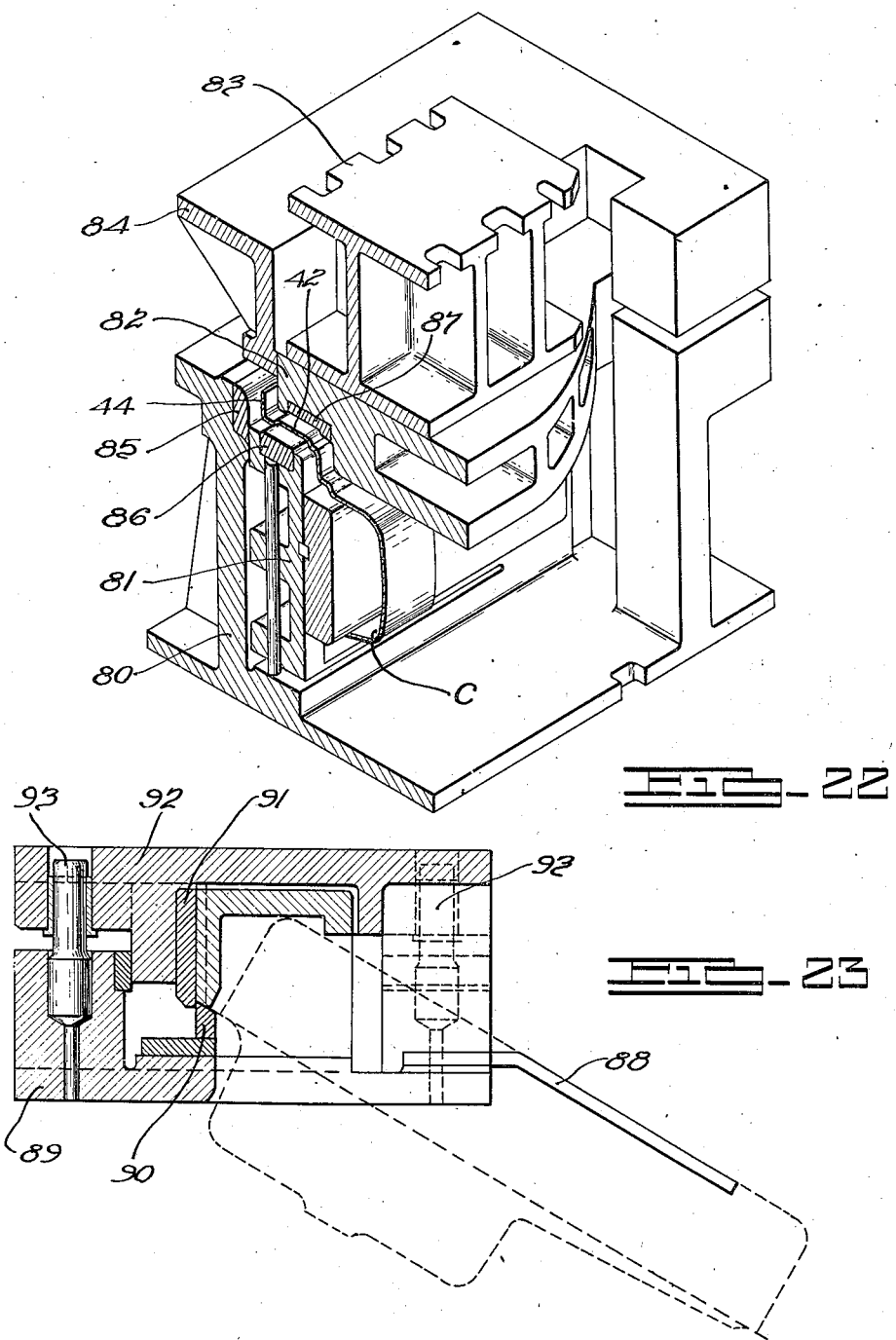
INVENTOR.
Vincent J. Graf.
BY Dike, Calver & Gray
ATTORNEYS.

Patented May 12, 1942

2,282,571

UNITED STATES PATENT OFFICE 2,282,571

METHOD OF MAKING SINKS

Vincent J. Graf, Detroit, Mich., assignor, by mesne assignments, to Steel Plumbing Wares, Inc., Detroit, Mich., a corporation of Michigan Application September 20, 1937, Serial No. 164,645

4 Claims. (Cl. 113—20)

This invention relates to sinks, washbasins and the like, and more particularly to the fabrication thereof by stamping operations from sheet metal, preferably sheet steel. The present application is a continuation in part of my co-pending applications Serial No. 663,711, filed March 31, 1933, now Patent 2,105,944, January 18, 1938, and Serial No. 92,803, filed July 27, 1936, now Patent 2,127,559, August 23, 1938.

Great difficulties have been experienced in forming articles of the above character, particularly from a single metal sheet, because of the necessity to form a rolled or turned rim around the basin and the drainboards thereof, which rim is to merge smoothly and seamlessly into the upright splashboard provided therein. In proximity to the junctures of such rim with the splashboard, the metal may be overstrained and broken in some places, while folds of excessive metal may be formed in others which necessitates repairing such places by cutting out the excessive metal, patching and welding the broken places. This, besides complicating the manufacturing processes, results in producing inferior articles, rendering it difficult to produce an enamel finish free of blemishes and imperfections. Preformation of the places of juncture of the turned or rolled rim with the drainboard has solved the above difficulties but introduced additional operations and apparatus.

One of the objects of the present invention is to provide an improved method of forming the articles of the above character from a single metal sheet or blank, whereby the above difficulties are overcome and largely eliminated and a relatively simplified and efficient method is provided.

A further object of the invention is to provide an improved method of making a sink or the like from a sheet metal blank, the sink being formed with a splash panel, a substantially flat horizontal rim extending around three sides of the basin and a substantially flat shelf coplanar with the rim extending rearwardly of the basin and also the length of the sink, and in which the junctures of the flat rim and the splash panel are maintained seamless during the operations of bending up the splash panel and bending down the apron which depends from the rim. Thus, it will be seen that no slitting and welding is necessitated at the top of the sink where the flat rim merges into the splash panel, permitting savings in the cost of production and greater uniformity in the attractive appearance of sinks made in accordance with the invention.

Another object of the invention is to provide an improved method of forming a sink having a basin and a splashboard whereby the usual cracking of the metal near the places of juncture of the back wall of the basin is eliminated.

It is an added object of the invention to provide an improved method of formation of articles of the above character which method includes a small number of pressing operations of a relatively simple character.

Other objects of this invention will appear in the following description and appended claims, reference being had to the accompanying drawings forming a part of this specification wherein like reference characters designate corresponding parts in the several views.

Fig. 1 is a perspective view of a double drainboard sink formed in accordance with the method embodying the present invention.

Fig. 2 is a transverse vertical sectional view of the structure shown in Fig. 1, looking in the direction of the arrows, section being taken along the line 2—2 of Fig. 1.

Fig. 3 is a perspective view of a left hand drainboard sink formed in accordance with the method embodying the invention.

Fig. 4 is a longitudinal sectional view of the structure shown in Fig. 3, looking in the direction of the arrows, section being taken on the line 4—4 of Fig. 3.

Fig. 9 is a view taken in the direction of the arrows on the transverse vertical section through the line 9—9 of Fig. 8.

Fig. 10 is a perspective view illustrating the step of simultaneously forming the main basin and the drain beads in a blank for the right hand sub-basin sink.

Fig. 11 is a perspective view illustrating the operation of trimming of the metal blank for the sink of Fig. 1.

Fig. 12 is a perspective view illustrating the step of simultaneously forming the shell and the splashback or panel.

Fig. 13 shows in perspective, the metal blank after drawing the flanges of the splashback and embossing the face thereof.

Fig. 14 is a perspective view illustrating the operation during which the excess metal at the corners of the splashback is removed.

Fig. 15 shows in perspective the metal blank after drawing the depending apron flange around three sides thereof, the dotted line indicating the position of the edge before the drawing operation.

Fig. 16 is a sectional view on the line 16—16 of Fig. 15.

Fig. 17 is a perspective view with sections broken away illustrating the operation of forming the wall flanges along the top and ends of the splashback, the dotted line indicating the position of the metal before said operation.

Fig. 18 is a view similar in part to Fig. 17, illustrating the operation of forming the bottom flange along the lower edge of the depending apron.

Fig. 19 shows in perspective, the sink blank after the operation of piercing the faucet and spout holes.

Fig. 22 is a perspective view, partly in section, illustrating a die device in which the blank may be operated upon in order to form the rearwardly extending flanges on the splashback.

Fig. 23 is a perspective view, partly in section, showing a die device for trimming the corners of the blank after the operation performed in the die device illustrated in Fig. 22 is completed.

Figure 5:
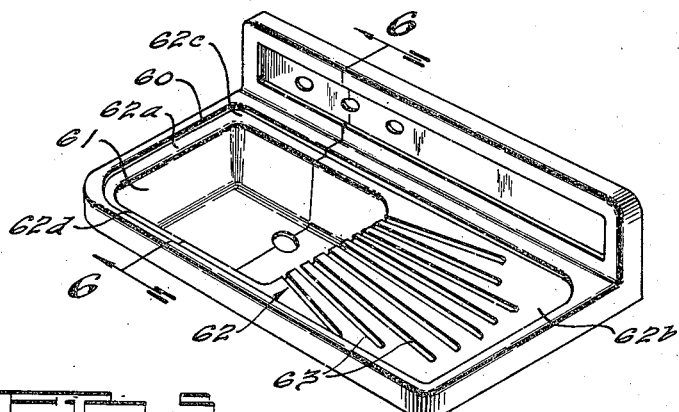
Fig. 5 is a perspective view of a right hand drainboard sink formed in accordance with the method embodying the invention.
Figure 6:
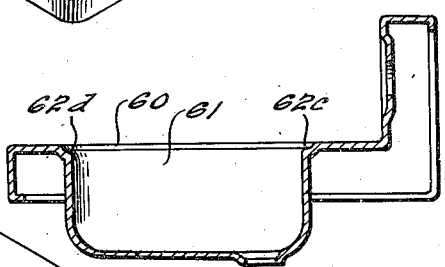
Fig. 6 is a transverse sectional view of the structure shown in Fig. 5, looking in the direction of the arrows, section being taken on the line 6—6 of Fig. 5.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, three sink structures produced in accordance with the method embodying the present invention. Referring particularly to Fig. 1, the same represents a sink or washbasin comprising generally a horizontally extending face 20 in which there is formed a main or shallow basin 30, said basin being surrounded at its four sides by said horizontal portion 20. The latter comprises in the finished sink a back ledge or shelf 21 and a continuous rim 22, 23, 24 merging smoothly into the shelf and all forming a coplanar horizontal surface surrounding the main and sub-basins. In the bottom of said main basin 30 there is formed a second basin or fluid receiving bowl 31, which I term the sub-basin. It is an important feature of my invention, that the bottom of the main basin 30 extends around all four sides of said sub-basin 31, the corresponding parts of said bottom being indicated by the characters 32a, 32b, 32c and 32d. The back edge of the horizontal portion 20 merges seamlessly into an upright or vertically extending splashback indicated generally by the numeral 40. The face 41 of said splashback 40 may be suitably embossed, such for example as indicated by the panel embossing 42. A desired number of suitable faucet and spout holes 43, 43, is provided in the splashback. At its top and ends the splashboard 40 is provided with rearwardly extending flanges such as 44, 45, and 46, which flanges are in turn provided with narrow wall flanges 47, 48 and 49, respectively (see Fig. 17). The ledge 21 which extends between the main basin 30 and the splashback 40 is made of such width as to permit its use as a shelf for such articles as glasses and the like. The continuous rim portions 22, 23 and 24 which extend around the front and sides of the main basin 30 are preferably made somewhat narrower than the shelf 21. The horizontal rim portions 22, 23, 24 are turned downwardly to provide a continuous seamless depending apron, the respective portions whereof being designated by the numerals 25, 26 and 27. The lower edges of said apron are provided with a substantially horizontal, continuous inwardly extending flange such as indicated at 28.

The bottom 32 of the main basin 30 is preferably made slightly sloping toward the sub-basin 31, and it is provided with a number of suitably disposed drain grooves or beads such as 33, 33. In the structure shown in Fig. 1 the sub-basin 31 is located substantially in the middle of the bottom 32, and said beads 33, 33 are arranged in two groups at both sides of said sub-basin 31, thus providing a double drainboard sink, with portions 32a and 32b of the bottom 32 serving as drainboards.

The bottom 32 merges seamlessly into the walls of the sub-basin 31, which sub-basin is made deeper than the main basin 30. The bottom 34 of the sub-basin 31 is made slightly sloping toward a drain hole 35, which hole is preferably located not at the center of said bottom 34, but closer to the back wall 36 of the basin. By virtue of this construction it is possible to locate the spout outlet directly above the drain hole 35 without requiring the use of a spout of excessive length or overhang from the splashback to the fluid receiving bowl.

Referring to Fig. 3 there is shown in this instance a sink similar in part to the structure of Fig. 1, the sub-basin however being arranged to provide a so-called left hand drainboard sink. As shown in Fig. 3, the sub-basin 51 is arranged at the right hand side of the bottom 52 of the main basin 50, there being a narrow ledge 52b between the sub-basin 51 and the right hand side wall of the main basin 50, and ledges 52c and 52d formed by the bottom 50. In other words, while in the previous structure the portions 32a and 32b extending at both sides of the sub-basin 31 are substantially symmetrical in the structure of Fig. 3 the drainboard portion 52a is similar to the drainboard portion 32a of the embodiment of Fig. 1 and is provided with beads such as 53, 53. The narrow ledge 52b has a width preferably equal to that of the ledge 52c and ledge 52d.

Referring to the embodiment illustrated in Fig. 5, the structure herein shown is a left hand sub-basin sink differing from the structure of Fig. 3 by the arrangement of the sub-basin 61 in the bottom 62 of the main basin 60. As can be clearly seen in Fig. 5, the sub-basin 61 is arranged at the left hand side of said bottom 62, the narrow ledge 62a corresponding to the ledge 52b of the structure shown in Fig. 3 while the sloping portion 32b is provided with beads such as 63, 63 similar to the portion 32b of the structure of Fig. 1. Horizontal ledges 62c and 62d formed as a part of the bottom 62 of the main basin 60 are located along the front and the back walls of said sub-basin 61. As in the previous embodiments the main basin extends at all four sides of the sub-basin.

Figure 7:
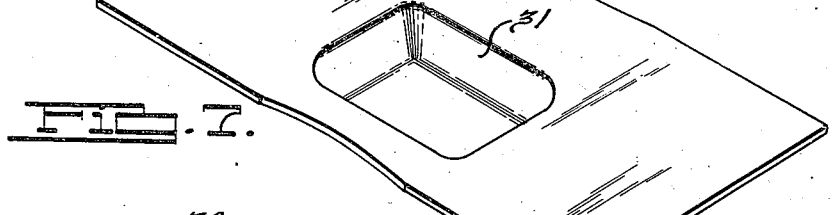
Fig. 7 is a perspective view showing a metal blank from which the sink of Fig. 1 is fabricated, with the sub-basin preliminarily formed.
Figure 8:
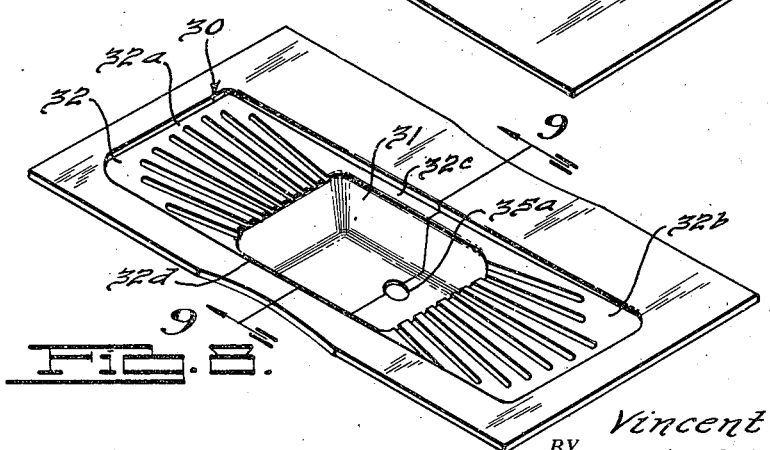
Fig. 8 is a perspective view illustrating a succeeding step in fabricating the sink, at which the shallow main basin and two groups of beads at the bottom thereof are formed in one operation.

Figs. 7 to 10 inclusive, illustrate preferred steps in the method of forming the sinks in accordance with the invention from a single sheet metal blank. In fabricating the double drainboard sink of Fig. 1 a single sheet metal blank 70 is placed in a suitable press and the central portion is preliminarily drawn to provide the sub-basin 31, as illustrated in Fig. 7, this being accomplished by a suitably shaped die. In a succeeding operation the blank is operated upon in suitable dies to form simultaneously the main basin 30 and the drain beads 33 in the bottom 32 thereof, as illustrated in Fig. 8. In the same or succeeding operations the sub-basin 31 may be re-struck and completed as to shape and depth, as well as embossed for the drain hole 35 as indicated at 35a, and its bottom made sloping toward said embossed portion, as illustrated in Fig. 9. In Fig. 10 there is shown a blank for the right sub-basin sink after similar operations have been performed thereon.

In accordance with the next preferred step in the method, the blank is preferably rough trimmed around its edges 71, and a suitable shape facilitating further forming operations is given to the corners 72, 73 thereof.

Figure 20:
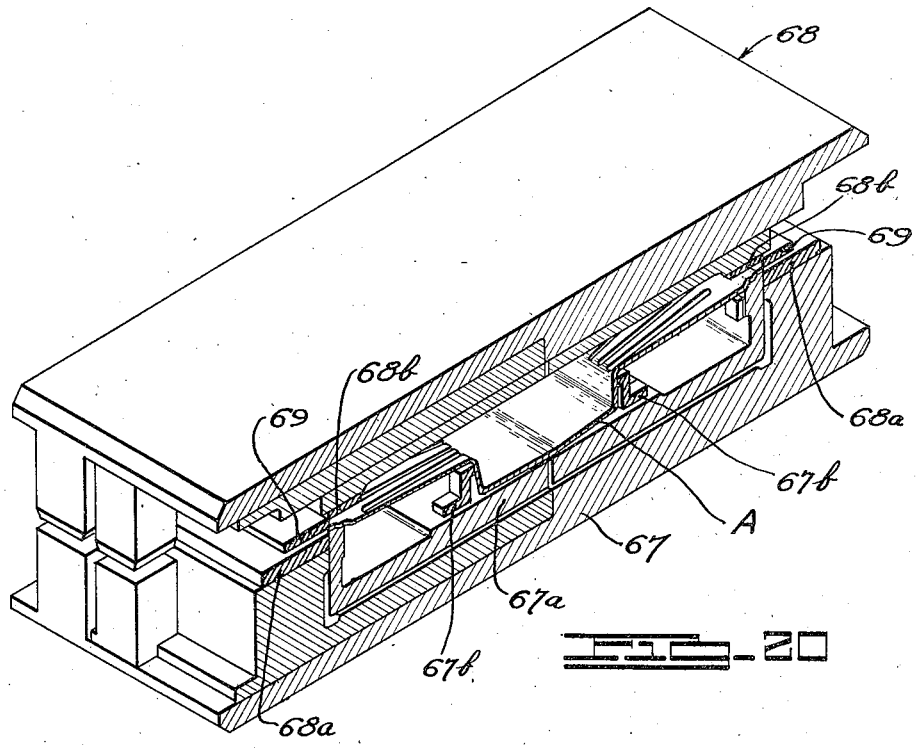
Fig. 20 is a perspective view, partly in section, illustrating a die device in which the blank trimming operation may be performed.

The trimming operation may be performed in a suitable die device, such, for instance, as one illustrated in Fig. 20, wherein the blank operated upon is indicated by the reference character A. Referring to said figure, the die device illustrated therein comprises a stationary die shoe 67 having sub-dies 67a provided with gauge brackets 67b adapted to locate the blank A in the proper operative position in the die device. The die shoe 67 is provided with cutting steels 68a cooperating with corresponding cutting steels 68b carried by the movable punch holder 68. Spring pressed members 69 are adapted to hold the edges of the blank A when the trimming operation is being performed.

In some instances, it may be desirable to cut out portions of the metal at the corners 72 of the blank, as seen in Fig. 12, in order to provide space for the flow of metal in the blank and to prevent formation of folds or wrinkles because of the excess of marginal metal at the corners.

In the following operation the metal in rear of the upright back wall of the sub-basin 31 is formed or bent up along the line 74, 74 (see Fig. 11), thus simultaneously forming the shelf 21 and the face 41 of the back panel or splashboard 40 (see Fig. 12).

Figure 21:
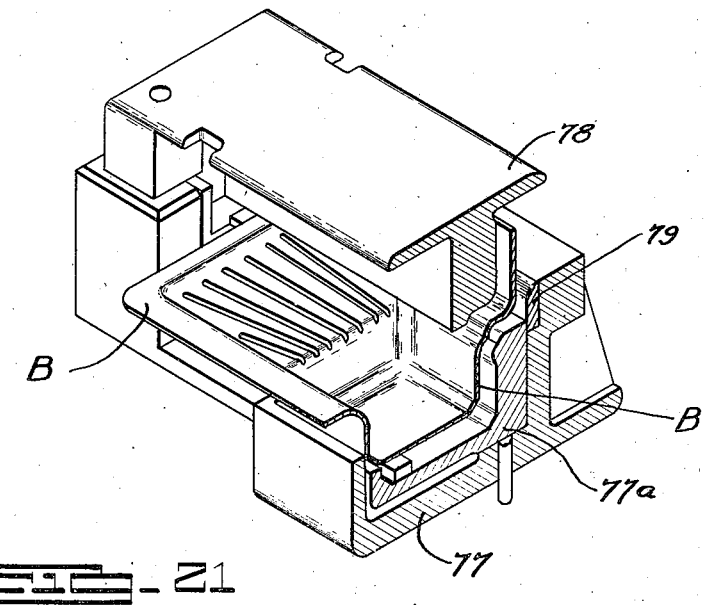
Fig. 21 is a perspective view, partly in section, illustrating a die device in which bending of the blank to form the splashback may be performed.

This operation may be performed in any suitable die device, such, for instance, as one illustrated in Fig. 21, wherein the blank operated upon is indicated by the reference character B. Referring to said figure, the die device illustrated therein comprises a stationary die shoe 77 carrying a pressure pad 77a adapted to receive and support during the operation the blank B. The movable punch holder 78 is adapted to cooperate with the insert 79 in bending the blank for producing the portion 41.

It is an important feature of the present invention that the rearwardly extending flanges 44, 45 and 46 of the splashback 40 and the depending apron portions 25, 26 and 27 (see Fig. 1) provided around the horizontally extending part of the sink structure and merging as indicated at 29 into said flanges smoothly and seamlessly are formed by two separate operations and by pressing the marginal metal of the blank in two directions, as explained in detail below.

For effecting the formation of flanges 44, 45 and 46 on the blank shown in Fig. 12, the marginal metal of the upstanding portion 41 formed in the preceding operation is pressed in the direction perpendicular to the portion 41, as indicated by the arrows in Fig. 12, substantially along the dotted line 75. Simultaneously the face 41 may be embossed as at 42, since embossing of the face 41 requires pressing also in the direction perpendicular to the splashback. These operations whether performed separately or simultaneously may be performed in dies of various constructions. I prefer to use the die structure illustrated in Fig. 22, wherein the blank designated by the character C is shown in the operative position, as it appears after the operation is completed. The die structure illustrated in said figure comprises a stationary die shoe 80 to which is secured a die pad 81 cooperating with the punch 82 secured to the inner slide 83 of a suitable press (not shown). The outer slide 84 of the press is adapted to hold the blank C during the forming operation. The die pad 81 is provided with steel inserts 85 and 86, while the punch 82 carries an insert 87, said inserts coming in contact with the surfaces of the blank C and transmitting forming pressure thereto.

The result of the operation performed in the above described die device is illustrated in Fig. 13, wherein the splashback 40 is shown provided with a continuous uninterrupted flange along its top and ends, the portion of said flange running along the top of the splash being indicated by the numeral 44, while those running along the ends of said splashback are indicated by 45 and 46.

The blank having been drawn to the approximate form illustrated in Fig. 13, the next step in the method preferably consists in trimming of the corners of the splashback 40 in order to remove the surplus marginal metal which might interfere with the performance of subsequent operations. Such trimming may be accomplished in a die device such, for instance, as one illustrated in Fig. 23, wherein the blank, indicated in dotted lines, is held in an inclined position, being properly located with the aid of a bracket 88. The die device illustrated in said figure comprises a stationary die shoe 89 to which is secured a lower cutting blade 90 cooperating with an upper cutting blade 91 secured to the movable holder 92. Guide pins 93 are provided to ensure proper functioning of the die device. The die device illustrated in Fig. 23 is used for trimming the left-hand corner only, a similar die being used for trimming the right-hand corner of the blank. The trimming is done substantially along the heavy dotted line 94 (see Fig. 13).

After the corner trimming operation is completed, the blank has the shape as illustrated in Fig. 14. The next step in the method preferably consists in forming the depending apron flange. This is effected by pressing or turning downwardly the marginal metal of the horizontally extending rim forming portion of the blank approximately along the dotted line 76 (see Fig. 14). As can be seen in Fig. 15 wherein the result of this operation is illustrated, there is thus produced a continuous depending apron consisting of seamlessly merging portions 25, 26 and 27, the rearmost extremities of the portions 25 and 27 merging seamlessly into the lowermost extremities of the splashboard flange portions 46 and 46, respectively, such, for instance, as indicated at 29.

In many prior structures having flanges corresponding to the flange 46 of the present structure, and aprons similar to the apron 27 joined to the flange 46 as at 29, it has been common to form both the flange 46 and apron 27 while the blank is still flat, or before it is bent at a right angle, as along the line 74. In accordance with such methods the flanges and aprons have been formed simultaneously by pressure in one, usually a downward direction. The integral flange so formed was thereupon slit up to the line of intended bend, and the blank bent as usual. Thereupon triangular patches were welded into the open space corresponding to the locality 29 in the present structure. Serious disadvantages of such methods have been entirely eliminated by forming the flange 46 and the apron 27 in separate operations. As explained, the flange 46 is formed when the edges of the splashboard, already bent 90 degrees with respect to the horizontal portion of the blank, are wiped rearwardly to form flanges 44, 45 and 46. The apron 27 is formed when the edges of the horizontal portion of the blank are formed by wiping the metal downward to form the apron portions 25, 26 and 27.

In addition to the foregoing steps in the formation of the sink, succeeding forming operations are desirable to provide flanging along the lower edge of the depending apron, such as shown at 28 (see Fig. 18), and providing a continuous wall flange along the rear flanged edges of the splashboard 46, comprised of mutually merging flange portions 47, 48 and 49 (see Fig. 17).

Fig. 19 shows the blank after the following operations of piercing and offsetting the drain hole 86, and piercing and countersinking the faucet and spout holes 43, 43.

In the present embodiment herein illustrated, I have set forth a sequence of steps by which the method may be satisfactorily performed. The invention, however, is not limited to the sequence herein given, as obviously certain steps may be combined or rearranged in different order. If desired, the splashboard panel and the horizontal rim and ledge may be formed first, after which the two basins may be pressed out. In certain instances the drainboard may be omitted, and the steps in the method of forming such modified structure be correspondingly rearranged.

From the foregoing it will be seen that the sub-basin or fluid bowl of the sink fabricated in accordance with the method embodying the invention is separated from the substantially flat top horizontal rim (which extends around three sides thereof) by a continuous narrow ledge and upright shoulder forming part of the primary basin and is also separated from the flat top back ledge or shelf by a corresponding narrow ledge and shoulder. This construction prevents, to a considerable extent, splashing of water from the fluid bowl over the flat rim. The back shelf and rim merge smoothly into one another and seamlessly into the splashback thus providing a smooth seamless surface, free of welds, which may be enamel coated satisfactorily in production so as to be free from unsightly blemishes.

It will be clear in view of the foregoing that with the aid of my improved method it is possible to produce a sink which has an upright splashboard near the back wall of its sump and a rim around the same, without encountering the manufacturing difficulties which have invariably been experienced with the use of previous methods. It can now be easily appreciated that said difficulties have resulted chiefly from the steps of bending the sheet up for formation of the splashboard along the upper edge of the back wall of the sump and, furthermore, along the line co-planar with the foot of the rim. Such attempts caused the formation of cracks along the upper edge of the back wall of the sump and necessitated effecting a smooth juncture of the rim with the splashboard portion bent at a right angle to the plane of the rim, which proved to be an exceedingly difficult operation. It may also be noted that the success of bringing the blank shown in Fig. 12 to the shape illustrated in Fig. 13 does not depend upon the fillet or the radius of curvature in the corners between the splashback 41 or portion 46 and the horizontal portion 21. In addition to the direction of the draw it depends partly upon allowing sufficient margin in order to provide enough metal from which to draw. The margin illustrated in the drawings gives good results with standard materials. In some cases it may be desirable to provide wider margin and make the portion 46 in the blank of Fig. 13 somewhat wider than the same is after trimming.

In one of its broader aspects my invention contemplates providing an improved method of fabricating sinks or washbasins in accordance with which the blank is bent up for formation of the splashboard at a certain distance toward the rear from the upper edge of the basin and furthermore along a line co-planar with the top of the rim.

I claim:

1. In a method of making a sink, the steps of drawing a relatively deep basin in a sheet metal blank while leaving substantially flat outwardly extending rim portions of the blank around all four sides of the basin lying in substantially a single plane, bending an upwardly extending splash panel from one of said rim portions along a line offset rearwardly of the upper edge of the back wall of the basin to provide a substantially flat shelf extending rearwardly of the basin and also extending the length of the sink in the common plane of said remaining rim portions, bending down the marginal portions of said remaining rim portions to provide a substantially flat horizontal rim and a depending apron extending continuously around three sides of the basin, and maintaining the junctures of the flat rim and splash panel seamless while carrying out said bending steps.

2. In a method of making a sink, the steps of drawing a relatively deep basin in a sheet metal blank while leaving substantially flat outwardly extending rim portions of the blank around all four sides of the basin lying in substantially a single plane, bending an upwardly extending splash panel from one of said rim portions along a line offset rearwardly of the upper edge of the back wall of the basin to provide a substantially flat shelf extending rearwardly of the basin and also extending the length of the sink in the common plane of said remaining rim portions, bending down the marginal portions of said remaining rim portions to provide a substantially flat horizontal rim and a depending apron extending continuously around three sides of the basin, and maintaining the entire line of juncture between the flat rim, shelf and splash panel seamless while carrying out said bending steps.

3. In a method of making a sink, the steps of drawing a relatively deep basin in a sheet metal blank, offsetting the blank to provide a drainboard at an end of the basin while leaving substantially flat outwardly extending rim portions of the blank around all four sides of the basin lying in substantially a single plane, bending an upwardly extending splash panel from one of said rim portions along a line offset rearwardly of the upper edge of the back wall of the basin to provide a substantially flat shelf extending rearwardly of the basin and also extending the length of the sink in the common plane of said remaining rim portions, bending down the marginal portions of said remaining rim portions to provide a substantially flat horizontal rim and a depending apron extending continuously around three sides of the basin, and maintaining the junctures of the flat rim and splash panel seamless while carrying out said bending steps.

4. In a method of making a sink, the steps of drawing a relatively deep basin in a sheet metal blank while leaving substantially flat outwardly extending rim portions of the blank around all four sides of the basin lying in substantially a single plane, bending an upwardly extending splash panel from one of said rim portions along a line offset rearwardly of the upper edge of the back wall of the basin to provide a substantially flat shelf extending rearwardly of the basin and also extending the length of the sink in the common plane of said remaining rim portions, flanging the marginal edge of the splash panel and also flanging downwardly the marginal portions of said remaining rim portions to provide a substantially flat horizontal rim around three sides of the basin, and maintaining the entire line of juncture between the flat rim, shelf and splash panel seamless throughout the length of the sink while carrying out said flanging steps.

VINCENT J. GRAF.